(12) United States Patent
Kousaka et al.

(10) Patent No.: US 8,137,786 B2
(45) Date of Patent: Mar. 20, 2012

(54) EPOXY RESIN COMPOSITION FOR FIBER-REINFORCED COMPOSITE MATERIAL

(75) Inventors: Takashi Kousaka, Hiratsuka (JP);
Tomohiro Ito, Hiratsuka (JP);
Mitsuhiro Iwata, Hiratsuka (JP);
Koichiro Miyoshi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 241 days.

(21) Appl. No.: 12/298,040

(22) PCT Filed: Apr. 24, 2007

(86) PCT No.: PCT/JP2007/058876
§ 371 (c)(1),
(2), (4) Date: Oct. 22, 2008

(87) PCT Pub. No.: WO2007/125926
PCT Pub. Date: Nov. 8, 2007

(65) Prior Publication Data
US 2009/0098335 A1    Apr. 16, 2009

(30) Foreign Application Priority Data

Apr. 25, 2006   (JP) ................................ 2006-120698
Sep. 28, 2006   (JP) ................................ 2006-264577

(51) Int. Cl.
*B32B 3/12* (2006.01)

(52) U.S. Cl. ...................... 428/117; 428/320.2; 428/368; 428/372; 428/394; 428/396; 428/408; 428/539.5; 524/105; 524/167; 524/170; 524/284; 524/366; 524/538; 524/612; 525/403; 525/409; 525/430; 525/436; 525/535

(58) Field of Classification Search .................. 525/403, 525/409, 430, 436, 535; 428/117, 320.2, 428/368, 372, 394, 396, 408, 539.5; 524/105, 524/167, 170, 284, 366, 538, 612
See application file for complete search history.

(56) References Cited

U.S. PATENT DOCUMENTS

| 5,413,847 A * | 5/1995 | Kishi et al. ...................... 442/69 |
| 5,447,785 A * | 9/1995 | Kishi et al. ...................... 442/60 |
| 6,429,157 B1 * | 8/2002 | Kishi et al. .................... 442/227 |
| 6,596,373 B1 * | 7/2003 | Kishi et al. .................... 428/116 |
| 2007/0251422 A1 * | 11/2007 | Maenaka et al. ......... 106/287.28 |
| 2007/0299164 A1 * | 12/2007 | Hayashi et al. ............... 523/457 |

FOREIGN PATENT DOCUMENTS

| JP | 63-221122 | 9/1988 |
| JP | 2-067333 | 3/1990 |
| JP | 11-043546 | 2/1999 |
| JP | 2003-238657 | 8/2003 |
| JP | 2004-277481 | 10/2004 |
| JP | 2004-346092 | 12/2004 |
| WO | WO 2005/097870 | * 10/2005 |

OTHER PUBLICATIONS

Kukdo YD-017 Standard Solid Epoxy Technical Data Sheet, Dec. 1, 2004.*
Kukdo YD-019 Standard Solid Epoxy Technical Data Sheet, Dec. 1, 2004.*

* cited by examiner

*Primary Examiner* — David W Wu
*Assistant Examiner* — Robert Jones, Jr.
(74) *Attorney, Agent, or Firm* — Connolly Bove Lodge & Hutz LLP

(57) ABSTRACT

Provided is an epoxy resin composition for fiber-reinforced composite materials, which is improved in toughness necessary for improving the strength of self-adhesion of a matrix resin for use in a prepreg for a face sheet of a honeycomb panel. The epoxy resin composition, which comprises: an epoxy resin (A); a thermoplastic resin (B); fine solid resin particles (C); and a curing agent (D), is characterized in that the epoxy resin composition after being cured has a morphology in which the epoxy resin (A) and the thermoplastic resin (B) form co-continuous phases, and the fine solid resin particles (C) are dispersed in at least the continuous phase of the epoxy resin (A) in the co-continuous phases.

18 Claims, No Drawings

EPOXY RESIN COMPOSITION FOR FIBER-REINFORCED COMPOSITE MATERIAL

CROSS REFERENCE TO RELATED APPLICATIONS

This application is a national phase of PCT/JP2007/058876, filed on Apr. 24, 2007, which claims priority to JP 2006-120698, filed on Apr. 25, 2006, and JP 2006-264577, filed on Sep. 28, 2006, the entire contents of which are incorporated herein by reference in their entireties.

TECHNICAL FIELD

The present invention relates to an epoxy resin composition for fiber-reinforced composite materials, and more specifically, relates to an epoxy resin composition for use in a self-adhesive prepreg for a face sheet of a honeycomb panel.

BACKGROUND ART

Fiber-reinforced composite materials containing an epoxy resin composition serving as a matrix resin have been widely used for aircrafts, automobiles, and industrial applications due to their superior mechanical properties and the like. Especially, as for structural and interior materials for aircrafts, from the perspective of achieving lighter weight, there are more cases where fiber-reinforced composite materials are used as face sheets of honeycomb panels.

Conventionally, a honeycomb panel is produced in so-called co-cure molding in which a film-type adhesive agent is placed on both sides of a honeycomb core, a prepreg (uncured fiber-reinforced composite material) serving as a face sheet is laminated on the both sides of the honeycomb core, and curing of a resin constituting the prepreg and adhesion between the face sheet and the honeycomb core are performed simultaneously. In recent years, aiming to obtain a lighter honeycomb panel and to reduce cost for molding, a so-called self-adhesion technique for directly bonding a honeycomb core and a prepreg has been demanded.

For causing a prepreg to exhibit self-adhesiveness, it is important to form a fillet by wetting a bonding surface between a honeycomb core and the prepreg with a resin of the prepreg in heat curing, so-called fillet forming, and to improve the shape and strength of the fillet. The fillet is formed by the resin in a state of hanging or climbing from the prepreg in a thickness direction of the honeycomb core along a wall of the honeycomb, and has a shape deeply associated with the viscosity of the resin. In addition, the strength of the fillet is affected by the toughness of a matrix resin constituting the prepreg.

Patent Document 1 discloses, regarding a thermosetting resin composition comprising a thermosetting resin and a thermoplastic resin, that the toughness of the thermosetting resin is improved by achieving a co-continuous phase morphology thereof after being cured. However, this thermosetting resin composition, although the toughness of the thermosetting resin is improved to some extent, has not necessarily been sufficient for improving toughness necessary for improving the strength of a fillet formed when a honeycomb and a prepreg are directly bonded.

Patent Document 1: Japanese patent application Kokai publication No. Hei. 2-305860

DISCLOSURE OF THE INVENTION

Problems to be Solved by the Invention

An object of the present invention is to provide an epoxy resin composition for fiber-reinforced composite materials which is improved in toughness necessary for improving the strength of self-adhesion of a matrix resin for use in a prepreg for a face sheet of a honeycomb panel.

Means for Solving the Problems

An epoxy resin composition for fiber-reinforced composite materials of the present invention which achieves the above object comprises: an epoxy resin (A); a thermoplastic resin (B); fine solid resin particles (C); and a curing agent (D). The epoxy resin composition is characterized in that the epoxy resin composition after being cured has a morphology in which the epoxy resin (A) and the thermoplastic resin (B) form co-continuous phases, and the fine solid resin particles (C) are dispersed in at least the continuous phase of the epoxy resin (A) in the co-continuous phases.

Effects of the Invention

In the epoxy resin composition for fiber-reinforced composite materials of the present invention, toughness can be improved by the formation of three-dimensional network structural co-continuous phases having the epoxy resin (A) and the thermoplastic resin (B) finely mixed with each other. The toughness can be further improved by the fine solid resin particles (C), which have been dissolved and made smaller, finely dispersing in at least the continuous phase of the epoxy resin (A). Hence, by using this epoxy resin composition as a matrix resin, self-adhesive strength of a prepreg can be further improved.

BEST MODES FOR CARRYING OUT THE INVENTION

In the epoxy resin composition of the present invention, the epoxy resin (A) is not particularly limited. However, preferred examples thereof are: bisphenol A-type epoxy resins; bisphenol F-type epoxy resins; naphthalene-type epoxy resins; diphenylfluorene-type epoxy resins; triglycidyl aminophenol resins; triglycidyl aminocresol resins; tetraglycidyl diaminodiphenylmethane resins; tetraglycidyl m-xylylene amine resins; N,N-diaminocresol resins; phenol novolac-type epoxy resins; cresol novolac-type epoxy resins; biphenyl-type epoxy resins; and dicyclopentadiene-type epoxy resins; and various modified epoxy resins of the above resins; along with crystalline epoxy resins and monomolecular crystalline epoxy resins. As for the epoxy resin (A), in order to enhance the compatibility with the thermoplastic resin (B) so as to thoroughly dissolve in the thermoplastic resin (B) in heat mixing, it is preferred to employ a liquid epoxy resin. From the resins listed above, a low molecular weight-type epoxy resin may be selected accordingly. As for the epoxy resin (A), according to demand characteristics of a prepreg, one resin alone or more than two kinds of resin in combination selected from the above-listed epoxy resins may preferably be used so that the morphology described above can be expressed in the epoxy resin composition after being cured.

The form of the epoxy resin (A) is preferably liquid at room temperature, and a viscosity thereof at a temperature of 25° C. is preferably from 1 to 100 poises, and more preferably from 5 to 50 poises. By setting the viscosity in this range, it is possible to easily adjust the viscosity of the epoxy resin composition to a proper range when the thermoplastic c resin (B) is added, and further to form co-continuous phases in the epoxy resin composition after being cured. It should be noted that viscosity at a temperature of 25° C. is a value measured using a BH-type rotary viscometer. To be more specific, a can containing an epoxy resin is placed in a thermostatic bath kept at a temperature of 25° C., and the value is read from the scale of the BH-type rotary viscometer when the load thereon is stabilized.

In the meantime, to the epoxy resin (A), an epoxy resin which is in a semisolid or solid state may be added within a range not impairing the effects of the present invention. For example, with respect to 100 parts by weight of the epoxy resin (A), an epoxy resin in a semisolid or solid state may be added in a proportion of 20 parts by weight or less.

The thermoplastic resin (B) dissolves in the epoxy resin (A) in heat mixing, and forms a separate phase in curing to form co-continuous phases which are finely mixed with each other. Accordingly, the thermoplastic resin (B) is required to have good compatibility with the epoxy resin (A). For this reason, the thermoplastic resin (B) preferably has a reactive functional group at its molecular end. Such a reactive functional group is not particularly limited. However, preferred examples are: a hydroxyl group; a carboxyl group; and an amino group, and especially preferred is a hydroxyl group.

Although kinds of the thermoplastic resin (B) are not particularly limited, they are preferably at least one kind selected from the group consisting of: polyethersulfone resins; polyetherimide resins; polyimide resins; polyamide resins; polyether resins; polyester resins; polysulfone resins; polyamide-imide resins; polyacrylate resins; polyarylether resins; polyphenylether resins; and polyetheretherketone resins. Among these resins, polyethersulfone resins and polyetherimide resins are preferred, and polyethersulfone resins are especially preferred because they are excellent in compatibility with epoxy resins, likely to form co-continuous phases, and capable of improving toughness.

It is preferred to use the thermoplastic resin (B) in a particle state, and more preferred to use those having a particle diameter of 200 μm or less, further preferred from 5 to 100 μm. By using fine particles having this particle diameter as the thermoplastic resin (B), the particles are dissolved rapidly and uniformly while avoiding having large particles left undissolved when added to an epoxy resin. Therefore, co-continuous phases can be formed easily after curing. In other words, by using fine particles having a particle diameter of 200 μm or less as the thermoplastic resin (B), the thermoplastic resin (B) is dissolved in the epoxy resin (A) uniformly; thus, co-continuous phases can be formed easily, and thereby toughness can be sufficiently improved A method for preparing fine particles having a particle diameter of 200 μm or less is not particularly limited; however, fine particles are preferably prepared by an impact grinding method or a spray drying method.

The epoxy resin composition of the present invention is characterized in that co-continuous phases of the epoxy resin (A) and the thermoplastic resin (B) mixed with each other are formed after curing, and the fine solid resin particles (C) are dispersed in at least the continuous phase of the epoxy resin (A) in the co-continuous phases. Since the fine solid resin particles (C) form a finer dispersion phase in at least the continuous phase of the epoxy resin (A), stress concentration inside the epoxy resin (A) phase can be dispersed to the entire part, and thereby toughness can be improved. Due to such improvement in toughness of the epoxy resin composition, the strength of fillet is increased, and thereby the strength of self-adhesion of the prepreg can be improved. It should be noted that the fine solid resin particles (C) are only required to be dispersed in at least the continuous phase of the epoxy resin (A), and may be dispersed in the continuous phase of the thermoplastic resin (B) as well.

A resin constituting the fine solid resin particles (C) is at least required to be a resin having high affinity with the epoxy resin (A), and may be either a thermosetting resin or a thermoplastic resin, or both used in combination. In particular, in the case of a thermosetting resin, it preferably comprises an epoxy resins, amaleimide resin, a cyanate resin, or the like. Among these resins, an epoxy resin is more preferred. Such an epoxy resin is not particularly limited; however, preferred examples include: bisphenol A-type epoxy resins; bisphenol F-type epoxy resins; phenol novolac-type epoxy resins; cresol novolac-type epoxy resins; dicyclopentadiene skeleton-based epoxy resins; and naphthalene skeleton-based epoxy resins. Bisphenol A-type epoxy resins are especially preferred.

As for an epoxy resin constituting the fine solid resin particles (C), phenoxy skeleton-type resins are more preferable, which are each prepared by purifying a bisphenol-type epoxy resin to increase the purity while increasing the molecular weight thereof, and thereby are each caused to have an epoxy group at its molecular end. With an epoxy group at its molecular end, the affinity to the epoxy resin (A) can be increased. The phenoxy skeleton-type resin is preferably a phenoxy-type resin including at least one selected from the group consisting of bisphenol A skeletons and bisphenol F skeletons. In the phenoxy skeleton-type resin, a higher softening point is achieved while the toughness is improved.

As for a thermoplastic resin constituting the fine solid resin particles (C), although not particularly limited, one having a reactive functional group at its molecular end is preferred because it is highly effective in improving toughness.

The molecular weight of a resin constituting the fine solid resin particles (C) is preferably from 10,000 to 100,000. When the molecular weight is in a range from 10,000 to 100,000, it is possible to prevent solid resin particles from being left undissolved and to dissolve them uniformly during curing of the epoxy resin composition, and, as a result of uniform dispersion of the solid resin particles, the toughness of the epoxy resin composition can be improved. It should be noted that, in the present invention, a molecular weight is a weight-average molecular weight measured by GPC analysis.

As for an epoxy resin constituting the fine solid resin particles (C), preferred is a high molecular weight-type resin, and more preferred is an epoxy resin having a weight-average molecular weight of from 10,000 to 35,000. A weight-average molecular weight in a range from 10,000 to 35,000 is preferred because fine particles can be easily prepared by an impact grinding method or the like, and particles can be dispersed better in a heat curing process of the epoxy resin composition.

As for a phenoxy skeleton-type resin, used as the fine solid resin particles (C), having an epoxy group at its molecular end, the weight-average molecular weight may be preferably from 50,000 to 60,000. This is because, when the weight-average molecular weight of the phenoxy skeleton-type resin is in a range from 50,000 to 60,000, fine particles can be easily prepared by an impact grinding method or the like, and these particles can be dispersed better in a heat curing process of the epoxy resin composition.

As for a phenoxy skeleton-type resin having an epoxy group at its molecular end, the epoxy equivalent may be preferably from 8,000 to 20,000 g/eq. When the epoxy equivalent is 8,000 g/eq or larger, the phenoxy skeleton-type resin does not dissolve completely in the epoxy resin (A) before heat curing; thus, it is possible to form a separated dispersion phase in the continuous phases of the epoxy resin (A) after the curing. When the epoxy equivalent is 20,000 g/eq or smaller, the phenoxy skeleton-type resin can easily dissolve in the epoxy resin (A) in heat curing.

An epoxy resin constituting the fine solid resin particles (C) is preferably made of a bisphenol A-type epoxy resin which is in a solid state at room temperature. Such a bisphenol A-type epoxy resin can be prepared by purifying a bisphenol-type epoxy resin to increase the purity while increasing the molecular weight thereof. This bisphenol A-type epoxy resin is preferred because it has a high softening point, and thereby improves workability of a prepreg, and effectively improves the toughness.

The bisphenol A-type epoxy resin has an epoxy equivalent of preferably from 1000 to 8000 g/eq, and more preferably from 2000 to 6000 g/eq. When the epoxy equivalent is 1000 g/eq or larger, the bisphenol A-type epoxy resin does not dissolve completely in the epoxy resin (A) before heat curing; thus, it is possible to form a separated dispersion phase in the continuous phase of the epoxy resin (A) after the curing. When the epoxy equivalent is 8000 g/eq or smaller, the bisphenol A-type epoxy resin can easily dissolve in the epoxy resin (A) in heat curing.

In order to completely dissolve the fine solid resin particles (C) in the epoxy resin (A) in heat curing, the fine solid resin particles (C) having a particle diameter of preferably 100 μm or less, more preferably from 5 μm to 100 μm, may be used. By setting the particle diameter of the fine solid resin particles (C) in this range, the fine solid resin particles (C) easily dissolve in the epoxy resin (A) when a predetermined temperature is reached in the heat curing process. Therefore, while the viscosity of the epoxy resin composition can be properly adjusted, toughness of the cured product can be improved due to the dispersion in the epoxy resin phase.

After the curing of the epoxy resin composition, the particle diameter of the fine solid resin particles (C) is preferably from 0.1 to 2 μm, more preferably from 0.1 to 0.5 μm. It is preferable to disperse the fine solid resin particles (C) having a particle diameter in a range from 0.1 to 2 μm in the continuous phase of the epoxy resin (A) because toughness of the cured resin product can be efficiently improved.

Kinds of the curing agent (D) are not particularly limited as long as a compound has an active group which can react with an epoxy group. However, preferred examples are: aromatic polyamines; aliphatic polyamines; imidazole compounds; tetramethylguanidine; thiourea-added amines; carboxylic acid anhydrides; carboxylic acid hydrazides; carboxylic acid amides; polyphenol compounds; novolac resins; and polymercaptans. Especially, in the perspective of improving the mechanical properties of a cured resin product, it is preferred to use aromatic polyamines. In particular, it is especially preferred to use diaminodiphenylsulfones, such as 3,3'-diaminodiphenylsulfone (3,3'-DDS) and 4,4'-diaminodiphenylsulfone (4,4'-DDS).

Furthermore, it is preferable that the curing agent (D) further use a latent curing agent. The latent curing agent is preferably at least one selected from the group consisting of: organic acid dihydrazides; dicyandiamides; aminimides; tertiary amine salts; imidazole salts; Lewis acids; and Bronsted acids; and especially preferred are organic acid dihydrazides and dicyandiamides. By using a latent curing agent, toughness of a cured resin product can be improved, in other words, self-adhesiveness of the prepreg can be increased by improving strength of the fillet. Among others, as the curing agent (D), it is especially preferable to use at least one curing agent selected from the group consisting of diaminodiphenylsulfones and latent curing agents.

The epoxy resin composition of the present invention may preferably contain, with respect to 100 parts by weight of the epoxy resin (A), the thermoplastic resin (B) in an amount of 20 to 60 parts by weight, more preferably 30 to 50 parts by weight, and fine solid resin particles (C) in an amount of 2 to 20 parts by weight, more preferably from 5 to 15 parts by weight.

By setting an amount of the thermoplastic resin (B) added in a range from 20 to 60 parts by weight, the viscosity of the epoxy resin composition can be properly adjusted, and thereby a favorable shape of the fillet can be obtained. By setting the amount to 60 parts by weight or less, workability of the prepreg, such as tackiness and drapability, can be improved. By setting an amount of the fine solid resin particles (C) added to 2 parts by weight or more, toughness of a cured product can be improved. By setting the amount to 20 parts by weight or less, it is possible to improve tackiness and drapability by achieving an appropriate hardness of the prepreg.

The curing agent (D) may be preferably added in an amount of 25 to 50 parts by weight, more preferably 30 to 45 parts by weight, with respect to 100 parts by weight of the epoxy resin (A). By setting an amount of the curing agent (D) added to 25 to 50 parts by weight, physical properties, such as strength, toughness, and thermal resistance, required for a cured resin product serving as a face sheet can be improved.

In the epoxy resin composition for fiber-reinforced composite materials of the present invention, the above components (A) to (D) are essential. However, within a range not impairing the effects of the present invention, various additive agents, such as publicly-known curing agents, fillers, stabilizers, flame retardants, and pigments, other than the above components (A) to (D), may be added as needed.

As for the epoxy resin composition of the present invention, the cured product thereof has a fracture toughness value, which is measured according to ASTM D5045-91, of preferably 1.8 MPa·$\sqrt{m}$ or larger, more preferably from 1.8 to 2.5 MPa·$\sqrt{m}$, and further preferably from 2.0 to 2.5 MPa·$\sqrt{m}$. When the fracture toughness value of the cured epoxy resin composition is 1.8 MPa·$\sqrt{m}$ or larger, the toughness of a fillet part is high, and the peeling strength can be so improved that material fracture occurs in a honeycomb core in a peeling test after bonding of a face sheet (prepreg) and the honeycomb core.

In the epoxy resin composition of the present invention, a minimum viscosity, which is measured in dynamic viscoelasticity measurement at a temperature rise rate of 2° C./minute, is preferably from 10 to 150 Pa·s, and more preferably from 20 to 150 Pa·s. Setting a minimum viscosity of dynamic viscoelasticity measured in a temperature rise process in the above range is necessary for expressing productivity and self-adhesiveness of the prepreg. When it is set to 10 Pa·s or above, a good fillet can be formed, and therefore self-adhesion is improved. When it is set to 150 Pa·s or below, a reinforcing fiber can be easily impregnated with the resin composition in prepreg production while maintaining the fillet formability. It should be noted that, in the present invention, a minimum viscosity in dynamic viscoelasticity measurement refers to a minimum value of complex viscosity measured on an epoxy resin composition as a sample in dynamic viscoelasticity measurement in a temperature range from 25° C. to 200° C. at a temperature rise rate of 2° C./minute at a frequency of 10 rad/second at a strain of 1%.

As for the epoxy resin composition for fiber-reinforced composite materials of the present invention, cured product thereof has a morphology in which three-dimensional network structural continuous phases having the epoxy resin (A) and the thermoplastic resin (B) mixed with each other are formed, and the fine solid resin particles (C) form a fine dispersion phase in at least the continuous phase of the epoxy resin (A). Therefore, the epoxy resin composition for fiber-reinforced composite materials of the present invention can exhibit significantly superior toughness compared to the case where the epoxy resin (A) and the thermoplastic resin (B) simply form co-continuous phases. In other words, since the epoxy resin (A) and the thermoplastic resin (B) form co-continuous phases having a three-dimensional network structure, the interface of these resins to which stress tends to concentrate forms a three-dimensionally continuous structure, and thereby the stress can be easily dispersed to the entire part, the adhesion on the resin interface is improved by good compatibility between these resins, and the thermoplastic resin (B) having superior toughness is formed as a continuous phase. As a result, toughness of the cured resin product can be improved. In addition, since the fine solid resin particles (C) are dispersed to form a fine dispersion phase in the continuous phase of the epoxy resin (A), it is assumed that stress loaded inside the phase of the epoxy resin (A) is dispersed, toughness of the epoxy resin (A) phase is improved, and thereby toughness of the entire cured resin product is further improved.

Although not particularly limited, a raw material used for the epoxy resin composition for fiber-reinforced composite materials of the present invention preferably includes: an epoxy resin (A) which is in a liquid state; the thermoplastic resin (B) which has a reactive functional group at its molecular end; the fine solid resin particles (C) which have a particle diameter of 100 μm or less; and the curing agent (D). By employing a liquid epoxy resin as the epoxy resin (A), it is possible to enhance compatibility thereof with the thermoplastic resin (B), and thereby to dissolve the thermoplastic resin (B) thoroughly in heat mixing.

By employing a thermoplastic resin having a reactive functional group at its molecular end as the thermoplastic resin (B), compatibility thereof with the epoxy resin (A) is improved, and thereby co-continuous phases of these resins mixed with each other in curing can be easily formed. Furthermore, it is preferable that the thermoplastic resin (B) be particle, and more preferably that the particle diameter thereof be 200 μm or less. By using such fine particles of thermoplastic resin, no particles remain undissolved and particles can be dissolved rapidly and uniformly when mixed with an epoxy resin. As a result, a co-continuous phase can be formed easily after curing.

Furthermore, with the fine solid resin particles (C) having a particle diameter of 100 μm or less, once a predetermined temperature is reached in the heat curing process, the fine solid resin particles (C) dissolve thoroughly and uniformly. Therefore, while the viscosity of the epoxy resin composition is adjusted, the fine solid resin particles (C) can be dispersed in the epoxy resin phase after curing. As a result, toughness can be further improved.

A method for producing the epoxy resin composition for fiber-reinforced composite materials is not particularly limited. However, it is preferable that the thermoplastic resin (B) be mixed and dissolved in the epoxy resin (A) with application of heat, the temperature of the mixed resin be lowered, and then the fine solid resin particles (C) be added thereto so as to be dispersed therein. Such a method is preferable because, with this method, the viscosity of the epoxy resin composition is appropriately maintained, and thereby a reinforcing fiber can be easily impregnated with the epoxy resin composition in prepreg molding. Thereafter, when the prepreg thus obtained is subjected to heat curing, the fine solid resin particles (C) dissolve in the epoxy resin (A) during heating, and become islands (dispersion phase) finely and uniformly dispersing in an ocean, which is at least the continuous phase of the epoxy resin (A), after curing.

To be more specific, a temperature for mix and dissolve the thermoplastic resin (B) in the epoxy resin (A) by application of heat is preferably from 95 to 150° C., and more preferably from 100 to 125° C. The thermoplastic resin (B) and the epoxy resin (A) are preferably stirred and mixed by using a planetary mixer for approximately 0.5 to 3 hours until being uniformly dissolved. This mixed resin is cooled to a temperature preferably from 60 to 90° C., more preferably from 70 to 80° C., and then the fine solid resin particles (C) and the curing agent (D) are added to the mixed resin, and uniformly dispersed and mixed to preferably prepare the epoxy resin composition. In such a production method, the thermoplastic resin (B) is thoroughly dissolved, while the fine solid resin particles (C) are dispersed uniformly. Hence, it is possible that a specific morphology is formed after curing, toughness is improved, and the strength of self-adhesion of the prepreg is improved.

The fiber-reinforced prepreg of the present invention includes the above-described epoxy resin composition for fiber-reinforced composite materials as a matrix resin in complex with a reinforcing fiber. Preferred examples of reinforcing fiber include carbon fibers, graphite fibers, aramid fibers, and glass fibers. Among these, carbon fiber and a carbon fiber fabric made thereof are especially preferred.

In the fiber-reinforced prepreg, the content of the matrix resin may be preferably set to 30 to 50 weight %, and more preferably set to 35 to 45 weight %. With the proportion of the matrix resin in the fiber-reinforced prepreg in this range, it is possible to increase self-adhesiveness of the prepreg while improving workability and appearance quality thereof, and further to cause the carbon fiber-reinforced composite material to fully exhibit mechanical properties.

As for a method for producing the fiber-reinforced prepreg, a hot-melt method is preferred in which a so-called resin film prepared by coating an exfoliate paper with the epoxy resin composition of the present invention in a thin film form is arranged above and below the reinforcing fiber, and the reinforcing fiber is impregnated with the epoxy resin composition by application of heat and pressure. Using a specific epoxy resin composition, the prepreg thus obtained is superior in tackiness and drapability, and improves prepreg workability. Thus, production efficiency of the prepreg can be improved.

By laminating the fiber-reinforced prepreg thus obtained on both sides of a honeycomb core and performing thereon heat curing molding, such as regular autoclave molding and hot-press molding, a fiber-reinforced composite material can be produced. The fiber-reinforced composite material thus obtained not only has a good fillet formed thereon and is superior in adhesiveness of the prepreg to a honeycomb core, but also is excellent in smoothness of the surface of the prepreg and has excellent appearance and surface characteristics with less porosity (uneven part on the surface).

A honeycomb core used in the present invention may be preferably any one selected from aramid honeycombs, aluminum honeycombs, paper honeycombs, and glass honeycombs. Among these, aramid honeycombs are preferred.

In the fiber-reinforced prepreg, the fine solid resin particles (C) having a particle diameter of 100 μm or less are dispersed. Accordingly, when a predetermined temperature is reached in the heat curing process, the fine solid resin particles (C) can be dissolved thoroughly and uniformly. As a result, while properly adjusting the viscosity of the epoxy resin composition, the fine solid resin particles (C) are dispersed in the epoxy resin phase upon the completion of the curing. Thus, toughness of the resin cured product can be further improved.

In the following section, the present invention will be further described by referring to Examples. However, the scope of the invention is not to be limited by these Examples.

EXAMPLES

Examples 1 to 5 and Comparative Examples 1 to 2

Epoxy resin compositions were prepared by mixing the epoxy resin (A), the thermoplastic resin (B), the fine solid resin particles (C), and the curing agent (D), which are selected from those listed below at mixing proportions respectively described in Examples 1 to 5 and Comparative Example 1 to 2 in Table 1. Characteristics of the epoxy resin compositions were evaluated. First, an entire amount of the epoxy resin (A) and the thermoplastic resin (B) were stirred and mixed using a planetary mixer set to a temperature of 125° C. for 75 minutes until a uniform solution was obtained. Thereafter, the temperature of the planetary mixer was set to 70° C. When the resin temperature became uniform, entire amounts of the fine solid resin particles (C) and the curing agent (D) were added to the solution, and stirred and mixed to prepare an epoxy resin composition.

Epoxy Resins (A)
Resin A-1: N,N,O-triglycidyl-p-aminophenol resin (MY-0510 manufactured by Huntsman Advanced Materials LLC), in a liquid state at room temperature, the viscosity at a temperature of 25° C. is 7 poises.
Resin A-2: triglycidyl alkyl aminophenol resin (ELM-100 manufactured by Sumitomo Chemical Co., Ltd.), in a liquid state at room temperature, the viscosity at a temperature of 25° C. is 10 poises.
Resin A-3: bisphenol F-type epoxy resin (YDF-170 manufactured by Tohto Kasei Co., Ltd.), in a liquid state at room temperature, the viscosity at a temperature of 25° C. is 35 poises.
Thermoplastic Resins (B)
Resin B-1: polyethersulfone resin (Sumikaexcel PES5003P manufactured by Sumitomo Chemical Co., Ltd.), prepared as fine particles having a particle diameter of 100 μm or less by impact grinding.
Fine Solid Resin Particles (C)
Particle C-1: bisphenol A-type epoxy resin (YD-019 manufactured by Tohto Kasei Co., Ltd.), prepared as fine particles having a particle diameter of 100 μm or less by impact grinding. Particle C-2: bisphenol A-type epoxy resin (YD-020N manufactured by Tohto Kasei Co., Ltd.), prepared as fine particles having a particle diameter of 100 μm or less by impact grinding.
Particle C-3: phenoxy-type bisphenol epoxy resin (YP-70 manufactured by Tohto Kasei Co., Ltd.), prepared as fine particles having a particle diameter of 100 μm or less by impact grinding.
Curing Agents (D)
Curing agent D-1: 3,3'-diaminodiphenylsulfone (ARA-DUR9719-1 manufactured by Huntsman Advanced Materials LLC)
Curing agent D-2: dicyandiamide (Epicure DICY 15 manufactured by Japan Epoxy Resins Co., Ltd.), latent curing agent Seven kinds of epoxy resin compositions (Examples 1 to 5, Comparative Examples 1 to 2) obtained as described above were each evaluated by a method described below in terms of minimum viscosity of the epoxy resin composition, tackiness and drapability of the prepreg, morphological observation and fracture toughness value of the cured product, and peeling strength of the honeycomb panel. Measurement results are shown in Table 1.

[Minimum Viscosity of Epoxy Resin Compositions]
A minimum value of complex viscosity was measured on each of the obtained epoxy resin compositions in a temperature range from 25° C. to 200° C. in dynamic viscoelasticity measurement at a temperature rise rate of 2° C./minute at a frequency of 10 rad/second at a strain of 1%.

[Tackiness and Drapability of Prepregs]
A resin film was formed on an exfoliate paper using each of the obtained epoxy resin compositions, and the film was transferred to a carbon fiber flat-woven fabric (T-300-3K manufactured by Toray Industries Co., Ltd.) by applying heat and pressure so as to achieve a resin content of 41 weight %. As a result, prepregs were obtained.

The prepregs thus obtained were evaluated by hand touching in terms of tackiness and drapability on a three-point scale described below.
Evaluation of tackiness of prepregs
Excellent: sufficient adhesiveness was sensed
Good: some adhesiveness was sensed
Poor: almost no adhesiveness was sensed
Evaluation of drapability of prepregs
Excellent: sufficient flexibility was sensed
Good: some flexibility was sensed
Poor: almost no flexibility was sensed

[Morphological Observation of Cured Products]
The obtained epoxy resin compositions were individually cured for 2 hours at a temperature of 180° C. in a programmed oven to prepare cured resin products.

The obtained cured resin products were each fractured by using a sharp blade, and fracture surface morphology was observed with a scanning electron microscope at a magnification of 5000 in terms of morphologies of the epoxy resin (A) and the thermoplastic resin (B) and dispersion diameter of the fine solid resin particles (C)

[Fracture Toughness of Cured Products]
The cured resin products obtained as described above were respectively used to prepare test samples according to ASTM D5045-91, and a fracture toughness value (MPa·√m) at 23° C. (dry condition) was measured.

[Peeling Strength of Honeycomb Panels]
Two sheets of prepregs made of the individual obtained epoxy resin compositions were laminated to each other, arranged on both sides of a honeycomb core (Nomex honeycomb SAH-1/8-8.0 manufactured by Showa Aircraft Industry Co., Ltd.), placed in a bag, and heated in an autoclave at a temperature of 180° C. for 2 hours (temperature rise rate of 2.8° C./minute) for curing to prepare a honeycomb panel. During this process, the inside of the autoclave was pressurized to 0.32 MPa with compressed air.

For the obtained honeycomb panels, the face sheets arranged the upper and lower sides of the honeycomb core in the heat curing process were each processed to a predetermined size, and peeling strength (lb-in/3 in) of test pieces of the upper-side face sheet and the lower-side face sheet at a temperature of 23° C. (dry condition) was measured according to ASTM D1781.

TABLE 1

|  |  |  | Example 1 | Example 2 | Example 3 | Example 4 | Example 5 | Comparative Example 1 | Comparative Example 2 |
|---|---|---|---|---|---|---|---|---|---|
| Epoxy resin | Resin A-1 | parts by weight | 60 | 60 | — | 60 | 60 | 60 | 60 |
|  | Resin A-2 | parts by weight | — | — | 50 | — | — | — | — |
|  | Resin A-3 | parts by weight | 40 | 40 | 50 | 40 | 40 | 40 | 40 |
| Thermoplastic resin | Resin B-1 | parts by weight | 40 | 40 | 40 | 40 | 40 | 40 | — |
| Fine solid resin particles | Resin C-1 | parts by weight | 18 | — | — | — | — | — | — |
|  | Resin C-2 | parts by weight | — | 18 | 12 | 10 | — | — | 20 |
|  | Resin C-3 | parts by weight | — | — | — | — | 10 | — | — |
| Curing agent | Curing agent D-1 | parts by weight | 34 | 34 | 34 | 34 | 34 | 34 | 34 |
|  | Curing agent D-2 | parts by weight | 2 | 2 | 2 | 2 | 2 | 2 | 2 |
| Properties of resin composition and its cured product | Minimum viscosity | Pa·s | 23 | 26 | 24 | 18 | 21 | 15 | 3 |
|  | Tackiness of prepreg |  | Excellent | Excellent | Excellent | Excellent | Excellent | Excellent | Excellent |
|  | Drapability of prepreg |  | Excellent | Excellent | Excellent | Excellent | Excellent | Excellent | Excellent |
|  | Morphology of epoxy resin and thermoplastic resin |  | Co-continuous | Co-continuous | Co-continuous | Co-continuous | Co-continuous | Co-continuous | — |
|  | Dispersion diameter of fine solid resin particles | μm | 0.2 | 0.2 | 0.2 | 0.2 | 0.2 | — | 0.2 |
|  | Fracture toughness value | MPa√m | 2.1 | 2.2 | 2.2 | 2.1 | 2.2 | 1.8 | 1.1 |
|  | Peeling strength of upper face sheet | lb-in/3 in | 25.2 | 24.9 | 25.3 | 24.2 | 25.4 | 19.0 | 10.1 |
|  | Peeling strength of lower face sheet | lb-in/3 in | 25.8 | 24.5 | 25.9 | 24.5 | 25.1 | 18.9 | 9.3 |

According to the results shown in Table 1, it was observed that, in each of Examples 1 to 5 of the present invention, the epoxy resin (A) and the thermoplastic resin (B) form fine co-continuous phases, and the fine solid resin particles (C) having a particle diameter of 0.2 μm are dispersed in the continuous phase of the epoxy resin (A). Meanwhile, it was observed that the fragment toughness values of the respective Examples 1 to 5 were extremely high ranging from 2.1 to 2.2 MPa·√m.

On the other hand, in the cured resin product of Comparative Example 1, although the epoxy resin (A) and the thermoplastic resin (B) form fine co-continuous phases, the epoxy resin (A) was not reinforced because no fine solid resin particles (C) were added, resulting in a low fracture toughness value of 1.8 MPa·√m. As for the cured resin product in Comparative Example 2, with no thermoplastic resin (B) added, no co-continuous phases were formed, resulted in a lower fracture toughness value.

Furthermore, Examples 1 to 5 of the present invention exhibited excellent properties both in tackiness, drapability of the prepreg, and peeling strength of the honeycomb panel. On the other hand, it was observed that Comparative Example 1 which contained no fine solid resin particles (C) and Comparative Example 2 which contained no thermoplastic resin (B) resulted in poor peeling strength of the honeycomb panel.

What is claimed is:

1. An epoxy resin composition for fiber-reinforced composite materials, comprising:
   an epoxy resin (A);
   a thermoplastic resin (B);
   fine solid resin particles (C); and
   a curing agent (D), wherein, in a morphology of the epoxy resin composition after being cured, the epoxy resin (A) and the thermoplastic resin (B) form co-continuous phases, and the fine solid resin particles (C) are dispersed in at least the continuous phase of the epoxy resin (A) in the co-continuous phases and completely dissolved in the epoxy resin (A) at the time of heat curing of the epoxy resin composition, wherein the epoxy resin composition contains, with respect to 100 parts by weight of the epoxy resin (A), 30 to 50 parts by weight of the thermoplastic resin (B) and 2 to 20 parts by weight of the fine solid resin particles (C); wherein the fine solid resin particles (C) is made of a resin having a molecular weight of from 10,000 to 100,000; wherein a fracture toughness value measured according to ASTM D5045-91 after curing of the epoxy resin composition is 1.8 MPa·√m or larger.

2. The epoxy resin composition for fiber-reinforced composite materials according to claim 1, wherein the thermoplastic resin (B) has a reactive functional group at its molecular end.

3. The epoxy resin composition for fiber-reinforced composite materials according to claim 1, wherein
   the thermoplastic resin (B) is both or any one of polyethersulfone resin particles and polyetherimide resin particles, and
   the particle diameter thereof is 200 μm or less.

4. The epoxy resin composition for fiber-reinforced composite materials according to claim 1, wherein the fine solid resin particles (C) are made of any one of an epoxy resin, a maleimide resin, a cyanate resin, which are in a solid state at room temperature.

5. The epoxy resin composition for fiber-reinforced composite materials according to claim 1, wherein the fine solid resin particles (C) are made of an epoxy resin having a molecular weight of from 10,000 to 35,000.

6. The epoxy resin composition for fiber-reinforced composite materials according to claim 1, wherein the fine solid resin particles (C) are made of a bisphenol A-type epoxy resin having an epoxy equivalent of from 1000 to 8000 g/eq.

7. The epoxy resin composition for fiber-reinforced composite materials according to claim 1, wherein the fine solid resin particles (C) are made of a phenoxy skeleton-type resin having an epoxy group at its molecular end.

8. The epoxy resin composition for fiber-reinforced composite materials according to claim 7, wherein the phenoxy skeleton-type resin has a molecular weight of from 50,000 to 60,000.

9. The epoxy resin composition for fiber-reinforced composite materials according to claim 7, wherein the phenoxy skeleton-type resin has an epoxy equivalent of from 8,000 to 20,000 g/eq.

10. The epoxy resin composition for fiber-reinforced composite materials according to claim 1, wherein the fine solid resin particles (C) have a particle diameter of from 0.1 to 2 μm in the morphology of the epoxy resin composition after being cured.

11. The epoxy resin composition for fiber-reinforced composite materials according to claim 1, wherein the curing agent (D) is made of any one or both of diaminodiphenylsulfone and a latent curing agent.

12. The epoxy resin composition for fiber-reinforced composite materials according to claim 1, wherein the epoxy resin composition has a minimum viscosity of from 10 to 150 Pa·s measured in dynamic viscoelasticity measurement at a temperature rise rate of 2° C./minute.

13. A fiber-reinforced prepreg, comprising the epoxy resin composition according to claim 1 as a matrix resin in complex with a reinforcing fiber.

14. The fiber-reinforced prepreg according to claim 13, wherein the fine solid resin particles (C) have a particle diameter of 100 μm or less.

15. The fiber-reinforced prepreg according to claim 13, wherein a content of the matrix resin is from 30 to 50 weight %.

16. The fiber-reinforced prepreg according to claim 13, wherein the reinforcing fiber is carbon fiber.

17. A honeycomb sandwich panel, comprising the fiber-reinforced prepreg according to any one of claim 13 and a honeycomb core that are laminated to each other.

18. The honeycomb sandwich panel according to claim 17, wherein the honeycomb core is any one selected from the group consisting of aramid honeycombs, aluminum honeycombs, paper honeycombs, and glass honeycombs.

* * * * *